United States Patent [19]

Ruddell et al.

[11] 3,981,952

[45] Sept. 21, 1976

[54] FIBROUS MATERIALS

[75] Inventors: James Nelson Ruddell, Portadown; Samuel McMeekin, Hillsborough, both of Northern Ireland

[73] Assignee: Lambeg Industrial Research Association, Lisburn, Northern Ireland

[22] Filed: July 24, 1972

[21] Appl. No.: 274,690

[30] Foreign Application Priority Data

July 27, 1971 United Kingdom............... 35153/71
Sept. 3, 1971 United Kingdom............... 41157/71

[52] U.S. Cl................................. 264/147; 264/175; 264/210 R; 264/284; 264/288; 264/289; 264/DIG. 47
[51] Int. Cl.²......................... B32B 3/10; B32B 5/02
[58] Field of Search................. 264/210 R, 175, 284, 264/289, DIG. 47, 147, 288

[56] References Cited
UNITED STATES PATENTS

| | | | |
|---|---|---|---|
| 3,199,284 | 8/1965 | Scragg ................................ | 264/289 |
| 3,387,077 | 6/1968 | Sammons et al.................. | 264/289 |
| 3,398,220 | 8/1968 | Port et al. .......................... | 264/147 |
| 3,500,627 | 3/1970 | Kim .................................... | 264/DIG. 47 |
| 3,724,198 | 4/1973 | Kim .................................... | 264/DIG. 47 |
| 3,746,607 | 7/1973 | Harmon et al..................... | 264/289 |

FOREIGN PATENTS OR APPLICATIONS

| | | | |
|---|---|---|---|
| 796,225 | 10/1968 | Canada................................ | 264/288 |
| 1,172,038 | 11/1969 | United Kingdom............. | 264/210 R |

*Primary Examiner*—Jeffery R. Thurlow
*Attorney, Agent, or Firm*—Alan H. Levine

[57] ABSTRACT

Disclosed is a process for treating a travelling film made from a molecularly-orientable synthetic thermoplastic organic polymer, according to which the film while in an unoriented condition and a molten deformable state has at least one of its sides modified so as to have a homogeneous series of high frequency discrete protuberances or depressions. This is achieved by subjecting the film to the action of an appropriately contoured surface. The frequency is at least of the order of 100 per inch. The center line average height of the protuberances or depressions is preferably from 1 to 10 microns. The process is advantageously used for making, inter alia, weaving tapes, twine and fibrous materials.

Also disclosed is apparatus for carrying out such a process. In a preferred form it comprises an extruder, a pair of nip rollers, at least one of which has an appropriately contoured surface, and a hot drawing means. Also disclosed are versions including slitting means and fibrillating means.

17 Claims, 4 Drawing Figures

FIBROUS MATERIALS

This invention concerns products made from films of plastics material.

It has been known for some time that such films made from molecularly-orientable synthetic thermoplastic organic polymers, such as certain polyolefins, polyamides and polyesters, can be given, by drawing a high degree of uniaxial molecular orientation, and can then be caused to fibrillate. Films of this kind are hereinafter called "films of the type described". The fibrillation may to some extent at least be spontaneous on drawing, but it is usual to manipulate the film (as by the use of pinned fibrillators, or by twisting or rubbing it) to obtain the high degree of fibrillation which has often been desired. It has been proposed to extrude or melt-emboss the film in such a manner that continuous parallel longitudinal grooves are formed therein which encourage fibrillation thereat, and in this way discrete longitudinal filaments are formed rather than generally random fibres or fibre networks or both. It has also been proposed that sheet material in openwork structural form be made of a process which involves forming a plurality of non-connected depressions in a sheet of thermoplastic polymeric material to leave thinned portions immediately below the bases of the depressions, and then subjecting the sheet to biaxial stretching so that the thinned portions develop expanded splits therethrough to constitute the openings of the network structure. This proposal however is not concerned with fibrillation in the sense in which that term is used in connection with the present invention, but with providing a regular pattern of relatively large well-separated depressions which will, under the influence of biaxial stretching, develop into apertures to facilitate the production of a structure analogous to that of expanded metal. For this reason the dimensions and frequency of occurrence of the depressions are on an entirely different scale to the dimensions and frequency of the depressions which are useful in practising the present invention.

The present invention is based on the discovery that the manner in which films of the type described tend to fibrillate, may be changed in a desirable manner for some purposes, by modifying the characteristics of one or both surfaces of the film in certain novel ways.

According to the present invention a travelling film of the type described, whilst in an unoriented condition and a molten deformable state, is subjected at at least one side thereof to the action of a travelling surface having, as an integral part thereof, a homogeneous series of high frequency discrete deformations, i.e., depressions or protuberances so as to give rise to a homogeneous series of discrete deformations, i.e., protuberances or depressions, as the case may be, of like frequency, on said film, and thereafter cooling said film to a non-molten state in which said protuberances or depressions are substantially retained, the dimensions of the protuberances or depressions on the film being such that the tendency for cracks which occur in the film after drawing to propagate, is substantially reduced.

By "molten deformable state" we mean a state in which the film is locally deformable under pressure and when so deformed has little or no tendency to revert to its original form of its own accord when the deforming pressure is removed. By "high frequency" we mean a frequency at least of the order of 100 per inch.

Subsequently the film may be drawn, usually to cause uniaxial orientation although additional or further drawing to cause biaxial orientation is not precluded. Before being drawn the film may be slit into a plurality of narrow tapes. The drawn film whether slit or not may be fibrillated.

Preferably the film is passed between two rollers which exert a nip pressure thereon as it emerges from an extruder and whilst still sufficiently hot to be in the molten deformable state, the surface of one or each rollers having depressions or protuberances as aforesaid.

The invention also embraces products made by the processes aforesaid.

Also according to the present invention apparatus for processing film of the type described includes means for travelling said film in unoriented condition and molten deformable state, a surface having, as an integral part thereof, a homogeneous series of high frequency discrete depressions or protuberances, means for bringing said surface into continuous travelling pressure contact with one side of said film so as to give rise to a homogeneous series of discrete protuberances or depressions, as the case may be, of like frequency, on said film, and means whereby the film is thereafter cooled to a non-molten state in which said protuberances or depressions are substantially retained, the dimensions of the depressions or protuberances on said surface being such that the protuberances or depressions on the film substantially reduce the tendency for cracks which occur in the film after drawing to propagate. The machine may also include a second surface of a like nature adapted to perform a like function with reference to the other side of the film. Preferably the or each surface is that of a rotatable roller.

The apparatus may be preceded by an extruder for the film, and may be followed by means for drawing the film, and means for heating the film whilst being drawn. In another embodiment means are provided for slitting the film into a plurality of narrow tapes; and in yet another embodiment there may be provided a pinned roller or like fibrillating means for the drawn film or tape.

Hereinafter when we refer to tendency to fibrillate we mean the tendency of cracks which occur after drawing to propagate.

The frequency of the depressions or of the protuberances in the surfaces used in the processes according to the present invention and comprised in the apparatus according to the present invention has already been defined as of at least the order of 100 per inch. As far as their cross-sectional dimensions are concerned these will obviously not be more than a few thousandths of an inch in any direction, at most of the order of three thousandths of an inch and usually much less. As far as their depth is concerned we prefer to define this by means of the centre line average height method for the assessment of surface texture according to British Standard No. 1134: 1961.

Thus defined we prefer their centre line average height to have a value within the range of 1 to 10 microns. However, subject to the minimum frequency already stated, suitable types of surface may correspond to those presented by the range of commercially available abrasive papers. Although the depressions or protuberances will often not be regular in size or frequency there is specifically comprised within the scope of the invention surfaces having a very regular pattern of depressions adapted to give rise to a correspondingly regular pattern of protuberances on the film, for example depressions measuring 0.003 inches transversely of the surface and 0.002 inches longitudinally of the surface, spaced from each other by 0.002 inches transversely of the surface and by 0.003 inches longitudinally of the surface, the depressions being staggered so as to overlap when viewed longitudinally of the surface. This pattern results in there being 40,000 protuberances per square inch of film surface.

As already indicated the surface may be that of a roller. A suitable surface material is siliconised rubber of shore hardness 55–80 which may be from ¼ to 3¼ inches thick, in which case the surface configuration may be produced by a suitable mix of ingredients. Surfaces of steel, brass or other metals may be used, or abrasive paper itself may be employed. When rollers are used, they may conveniently have a diameter within the range of say 1½ inches to 8 inches. The film as it comes under the influence of the surface may be usefully subjected to pressures ranging from say 8 lbs. to 90 lbs. per inch length of contact. The necessary surface configuration may be produced on a metal roller by, for example, sintering, machining, the use of a knurling-type tool, shot blasting or etching. Where only one side of a film is to be given the depressions or protuberances the other side will conveniently be supported by a smooth surface, for example the periphery a smooth, polished roller.

Film treated according to the invention has certain improved qualities, some, at least, surprising, and each of which, either from a processing point of view, or from the point of view of certain end uses, or both, are desirable.

From the processing point of view when slitting the film longitudinally or trimming the edges thereof, by cutting blades, it is found that slitting proceeds in a more controlled way, so that, in any event, but particularly if the cutting blades become blunt, there is less tendency for breakage of the film to occur in the drawing zone than with conventional film. Also, less force is needed to draw the film than to draw conventional film and drawing proceeds in a more uniform fashion.

From the point of view of end products, the method according to the invention is extremely useful for making certain products from films of the type described where the production technique involves drawing and subsequent manipulation, but where any undue degree of propagation of cracks which occur is undesirable in the end product. As an important example may be quoted the case of weaving tapes. Weaving tapes are strips of oriented plastics material, usually polyolefins, and especially polypropylene and polyethylene, which are used to make sacks, bale wrappings, backings for tufted carpets, anti-glare net and so on, usually by knitting or weaving the tapes. Too great a tendency to fibrillate is undesirable because it increases the likelihood of damage to the tape during conversion to the end product with consequent loss of strength, and also reduction in production efficiency, due, for example, to frequent end breakages and friction problems. In fact, there has been a tendency to use more expensive co-polymers in the manufacture of weaving tapes because these resist fibrillation more than the cheaper homo-polymers. Where homo-polymers have been used it has been the practice to limit the degree of draw used to orient the material to inhibit fibrillation, and clearly this has resulted in a material of reduced strength and high extensibility. By employing the present invention for the production of, for example, weaving tapes, substantial advantages result, all of which flow from the fact that the tendency to fibrillate is, surprisingly, discouraged or inhibited. Thus, the tape is more robust, is more capable of withstanding bending and flexure without fracturing and has reduced lustre and increased opacity. Because of the discouragement of inhibition of the tendency to fibrillate it is found that tapes may be handled much more efficiently, especially in such steps as winding, beaming, weaving and tufting. It is thought that much of this is due to a combination of the qualities just mentioned and a reduction of co-efficient of friction of the tape relative to the material from which certain instrumentalities involved in the steps mentioned are made. As far as tufting is concerned 'bursting" of the woven tape in the backing fabric by the needles used for tufting is much reduced, enabling for example finer tufting to be achieved and reducing the strength loss due to tufting. The increased ability of the tape produced according to the present invention to withstand bending and flexure without fracturing contributes to the improvement in efficiency of say weaving and knitting, and also influences the handle of fabrics made from the tape. The reduction in lustre and increase in opacity can result in an enhanced end product appearance, and the surface of fabric made from the tape has an improved receptivity so far as printing inks are concerned.

Also from the point of view of end products the invention may also be used to advantage in the production of a certain type of twine. This twine is conventionally made from a strip of oriented plastics material which is twisted, thereby causing fibrillation, the end product being in the form of a generally coarse yarn, and is used, for example for tying of packages or other goods (it is much used by the Post Office for bundling letters and by farmers for tying bales, as well as for more general purposes.) Such twine does not have an attractive appearance, has high friction characteristics and tends to lose strength fairly quickly on mechanical handling. By producing the twine in accordance with the present invention, because the tendency to fibrillate is reduced and the frictional properties of the product improved, there is a considerable reduction in the rate of strength loss in use, and in addition there is an improvement in appearance.

Again, so far as end products are concerned, the opacity and increased receptiveness to printing inks makes possible the production of paper substitutes by treating suitable films of the type described according to the invention.

Still dealing with end products, we have also discovered that fibrillation of film produced according to the invention when it is induced by the use of a pinned or like fibrillator does not occur in the same manner as in conventional fibrillated film. In particular the fibre denier and the range of deniers can be more precisely controlled. For example, in a given fibrillation process finer fibres with a narrower distribution range can be produced. Furthermore the hairs on the fibres are very much finer and as a result the fibres have a much cleaner appearance compared with conventional fibrillated film fibres.

For many end uses polyolefin film, especially polypropylene film, will be preferred.

The invention will now be described further by way of example only, with reference to the accompanying drawings, in which.

Figure 1:
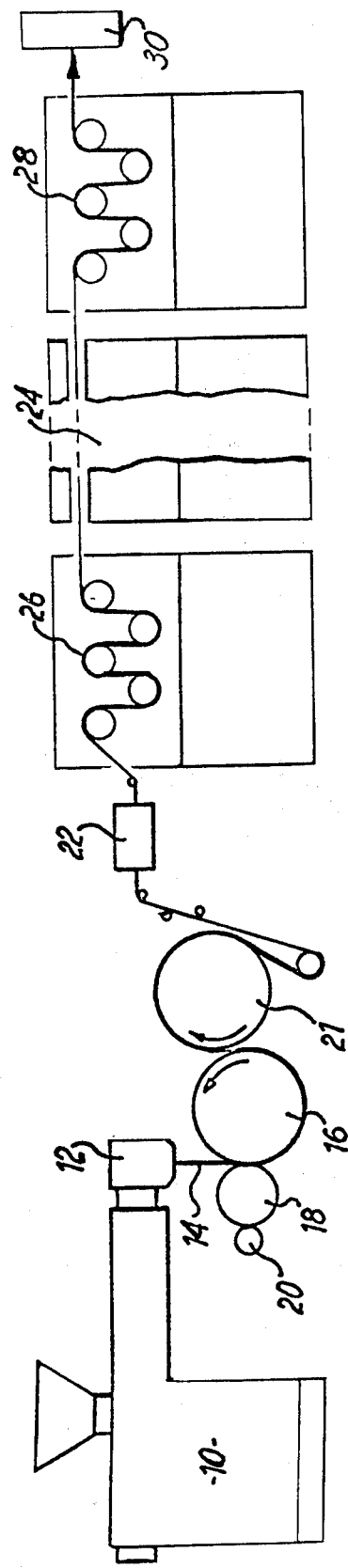
FIG. 1 is a schematic view of one form of machine line for carrying out one process according to the invention.

The machine lines shown in the drawings will first be described, followed by examples of processes which may be carried out thereon.

FIG. 1 shows a machine line suitable for producing weaving tapes.

An extruder 10 is fitted with a slot die 12, the latter being disposed so that extrudate in the form of a film 14 in molten deformable state passes vertically downwards directly into a nip between a metal chill roll 16 and another roll 18 surfaces with siliconised rubber. One or each roll has a pattern of discrete depressions or protuberances and the nip between them is adjustably pressurized. The chill roll 16 is cooled under thermostatic control by internally circulating water, and the rubber-surfaced roll is cooled by a cooling roller 20 spring-loaded into contact therewith. The film is then led away over another chill roll 21 and then to a battery of slitting devices 22 where it is slit into a plurality of narrow tapes. From there the film is drawn through a hot-air oven 24 between two sets of godet rolls 26, 28 the second set 28 of which rotates at a higher surface speed than the first set 26 to draw the tapes and thus orient the material thereof in a longitudinal direction. The tapes are finally wound onto separate spools 30.

Figure 2:
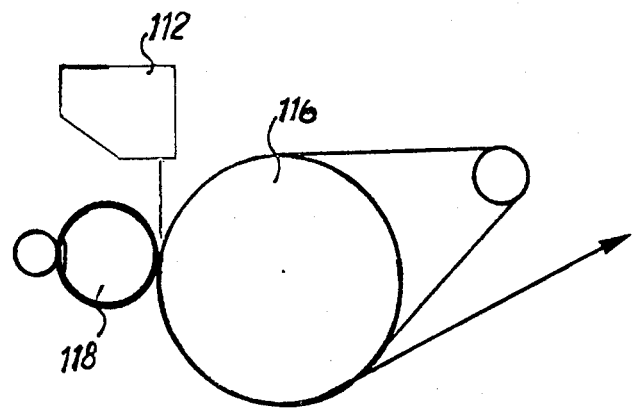
FIG. 2 is a schematic view of a modified section of the line illustrated in FIG. 1.

FIG. 2 shows alternative machine elements for incorporation in the line of FIG. 1. The slot die 112 feeds the extrudate 114 to the nip between the chill roll 116 and a rubber surfaced roll 118. In this case however an endless rubber belt 132 passes around the chill roll 116. Again one or both of rolls 118 and belt 132 could have the requisite pattern of surface irregularities.

Figure 3:
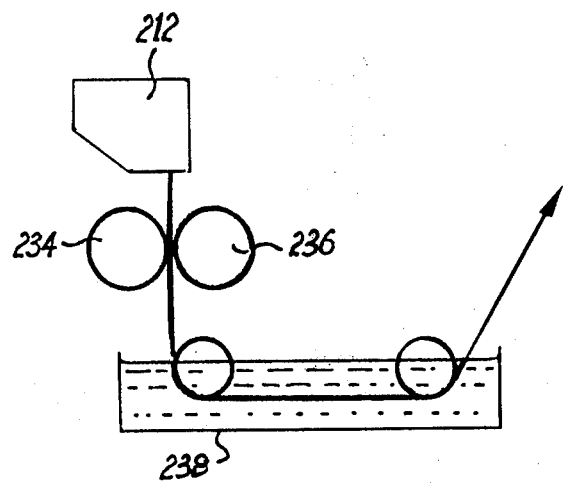
FIG. 3 is a schematic view of another modified section of the line illustrated in FIG. 1.

In FIG. 3 the slot die 212 feeds the extrudate between two small rubber surfaced rolls 234, 236, one or each of which has a pattern of surface irregularities and thence to a cooling bath 238, as shown, or to a chill roll system.

Figure 4:
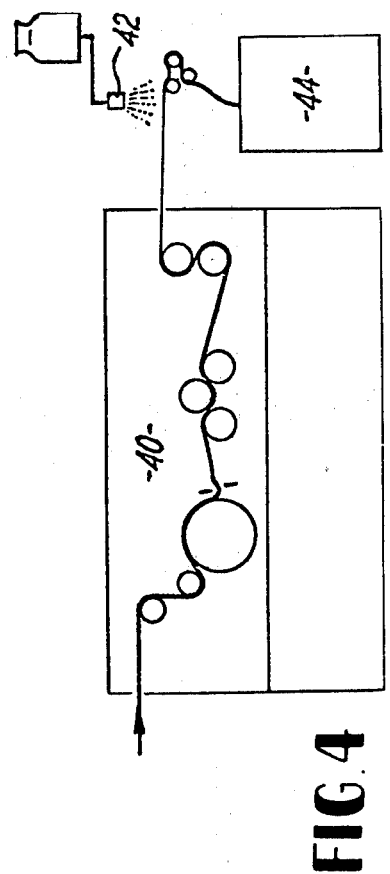
FIG. 4 is a schematic view of a fibrillating means which may form part of a machine line for carrying out another process according to the invention.

FIG. 4 illustrates a fibrillating unit to which film processed on the apparatus of FIG. 1, without the battery of slitting devices 22 and the spools 30, may be fed. It comprises a pinned roller fibrillator device 40, a spin-finish applicator 42 and a collecting can 44.

A number of examples of film treatment according to the invention will now be described.

EXAMPLE 1

Polypropylene resin of melt flow index 4.0 was produced and processed on the machine line of FIG. 1. The film was extruded from a 2 inch extruder 10 the barrel temperatures of which ranged from 220°C at the feed zone to 250°C at the delivery end and the die temperatures of which were set at 250°. The die 12, a conventional slot die, was set with its lips 0.022 inches apart and the screw and take off speeds involved were such to give a film of 0.003 inches thickness. The extrudate was delivered vertically, a distance of 5 inches directly in to a nip between the metal chill roll 16 and another roll 18. The metal chill roll 16, which is thermostatically controlled at 20°C by internally circulating water had a sintered surface composed of a homogeneous series of closely packed protuberances having a centre line average value of 3.0 microns in the circumferential direction and along a line on the surface of the chill roll parallel to the axis of the cylinder. The other roll 18 had a covering of siliconised rubber, diameter 8 inches, shore hardness 70°–75°, which, by virtue of the rubber mix used presented a surface composed of a homogeneous series of protuberances having a centre line average value of 6.0 microns in the circumferential direction and along a line on the surface of the roll parallel to the axis of the roll. In both cases the protuberances numbered in the region of some hundreds per inch in each direction, i.e., at least 10,000 protuberances per square inch of film surface. The pressure exerted by the rubber roll 18 on the chill roll 16 via the extrudate was 44 lbs. per inch width of the face of the rubber roll. The rubber roll 18 was cooled by the cooling roll 20 held in contact to it by a spring loaded system.

The extruded film 14, both surfaces of which were modified by depressions corresponding to the protuberances on the rollers 16, 18, was then led away over another chill roll 21, at 20°C. It was then taken through the battery of slitting devices 22 where the side sheet was slit into narrow tapes which were stretched in the hot air drawing over 24 at a stretch ratio of 6.5 : 1. The slitting devices were set such that the tapes after stretching each had a count of 700 denier. The tapes, which evidenced little tendency to fibrillate, were wound on to separate spools 30, creeled, off-wound and beamed on a direct warper woven on a conventional loom such as a Sultzer rapier loom, the weft being a similar tape to the warp.

The fabric thus produced, used, say as backing for tufted carpet, had the improved qualities previously referred to.

Example II

This process was carried out as in Example I except that the screw and take-off speeds were such as to give a film of 0.006 inches in thickness. The fabric had similar qualities.

Example III

This process was carried out as in Example II except that the pressure exerted by the rubber roller 18 on the chill roll 16 via the extrudate is 80 lbs. per inch width of the rubber roll. Again the fabric had similar qualities.

Example IV

In this example the process was carried out along the same general lines as in the previous examples. The extrudate however was delivered vertically through a distance of 3.6 inches from the die lips to the metal chill roll 16 and travelled around the chill roll 16 over a contact arc of 2½ inches before entering the hip. The roller 18 was of 2 inches diameter and had a surface shore hardness of 70. Various pressures from 8.8 lbs. to 53 lbs. per inch width of the face of the rubber roll 18 were used and satisfactory results obtained in all cases.

Example V

This process was carried out as in Example I except that different rubber rollers 18 all of 8 inches diameter but of shore hardnesses varying from 55 to 80 were used. In all cases satisfactory results were obtained.

Examples VI – X

The process of Examples I to V were repeated with the following modifications. Firstly, the battery of slitting devices was not used, and, secondly, the film was fibrillated after drawing in a conventional pinned roller fibrillator. The resulting fibres had the improved qualities previously referred to.

Example XI

According to this example twine was produced from polypropylene. The polypropylene resin was extruded as shown in FIG. 1 from a 2 inch extruder 10 the barrel temperatures of which ranged from 240°C at the feed zone to 260°C at the delivery end, and the die temperatures of which were set at 270°C. The die 12, again a conventional slot die, was set with its lips 0.022 inches apart and the screw and take-off speeds involved were such as to give a film of 0.005 inches thickness. The extrudate film in molten deformable condition was delivered onto a metal chill roll 16 having a smooth polished surface maintained at a temperature of 30°C. Whilst still in this condition passed through the nip between the chill roll 16 and another roller 18 made from brass, and contacted by a cooling roller 18. The surface of the brass roller was shot blasted all over to give a homogeneous series of depressions numbering hundreds to the inch and having a centre line average value of 6 microns in both the axial and circumferential directions. The temperature of the roll 18 was 60°C. The roll 18 was urged into pressure contact with the film so that a corresponding series of protuberances were formed on the one surface thereof. The set film was led away over the second chill roll 21 and through the battery 22 of slitting devices where the side film was slit into narrow tapes which were then drawn in the oven 24 at a draw ratio of 10 : 1. The slitting devices were set so that the tapes after stretching had a count of 3000 denier. The tapes were wound onto separate spools 30 and later fed to a heavy duty twisting frame where they were given one-and-a-half turns per inch. The resultant twines had a co-efficient of friction relative to themselves of 0.18, whereas twines from conventional film had a co-efficient of friction of 0.25, an enhanced appearance, being more opaque and less glittery. The twines were resistant to decay of strength through mechanical working and thus withstand more work and more handling than conventional twine before rupturing.

Example XII

The process of Example I was repeated using different rolls 16, 18. Roll 16 had a smooth highly polished surface. Roll 18 was of metal and had the very regular series of staggered depressions each measuring 0.003 inches by 0.002 inches described hereinbefore, produced for example by means of etching or a suitable knurling tool. As a result corresponding protuberances were produced on one surface of the film. Again very satisfactory weaving tapes were made having the same advantageous qualities.

We claim:

1. A process for treating a travelling film made from a molecularly-orientable synthetic thermoplastic organic polymer which includes the steps of pressing at least one side of the film, while it is in an unoriented condition and a molten deformable state, against a travelling surface in such a way that there is no relative movement between the surface of the film and travelling surface at the point of contact between the two, said travelling surface having, as an integral part thereof, a homogeneous series of high frequency discrete deformations so as to produce a homogeneous series of discrete deformations on said film, the frequency of the deformations being at least 100 per inch measured in every direction along the film surface, thereafter cooling said film to a non-molten state in which said deformations are substantially retained, whereby the tendency of cracks which occur in the film after drawing to propagate is substantially reduced, and subsequently drawing said film.

2. A process as set forth in claim 1 including the further and subsequent step of drawing the film to cause uniaxial orientation.

3. A process as set forth in claim 1 including the further and subsequent step of drawing the film to cause bi-axial orientation.

4. A process as set forth in claim 1 including the step of slitting the film, before any drawing step, into a plurality of narrow tapes.

5. A process as set forth in claim 1 including the step of fibrillating the film by means of a pinned roller or like fibrillator.

6. A process as set forth in claim 1 in which the frequency of the deformations on the surface is 200 or more per inch.

7. A process as set forth in claim 1 in which the film is treated as it emerges from an extruder.

8. A process as set forth in claim 1 in which the film is passed between two rollers which exert a nip pressure thereon, the surface of one or each roller having such a series of deformations.

9. A process as set forth in claim 1 in which the film is passed between two rollers which exert a nip pressure thereon, the surface of one roller being smooth and the surface of the other roller having such a series of deformations.

10. A process as set forth in claim 1 in which the said surface is that of an endless travelling band.

11. A process as set forth in claim 1 in which the transverse dimensions of the deformations are of the order of 0.003 inch or less.

12. A process as claimed in claim 1 in which the thickness of the film is 0.006 inch or less.

13. A process as claimed in claim 1 in which the centre line average height of the deformations is within the range 1 to 10 microns.

14. A process as claimed in claim 1 in which the surface exerts a pressure of between 8 and 90 pounds per inch width of the surface contact with the film.

15. A process as claimed in claim 1 in which the film is polypropylene film.

16. A process for treating a traveling film made from a molecularly-orientable synthetic thermoplastic organic polymer which includes the steps of pressing at least one side of the film while it is in an unoriented condition and a molten deformable state, against a travelling surface in such a way that there is no relative movement between the surface of the film and travelling surface at the point of contact between the two, said travelling surface having, as an integral part thereof, a homogenous series of high frequency discrete deformations so as to produce a homogeneous series of discrete deformations on said film, the frequency of the deformations being at least 10,000 per square inch of film surface, thereafter cooling said film to a non-molten state in which said deformations are substantially retained, whereby the tendency of cracks which occur in the film after drawing to propogate is substantially reduced, and subsequently drawing said film.

17. A process as set forth in claim 16 wherein the frequency of the deformations is at least 40,000 per square inch of film surface.

* * * * *